UNITED STATES PATENT OFFICE.

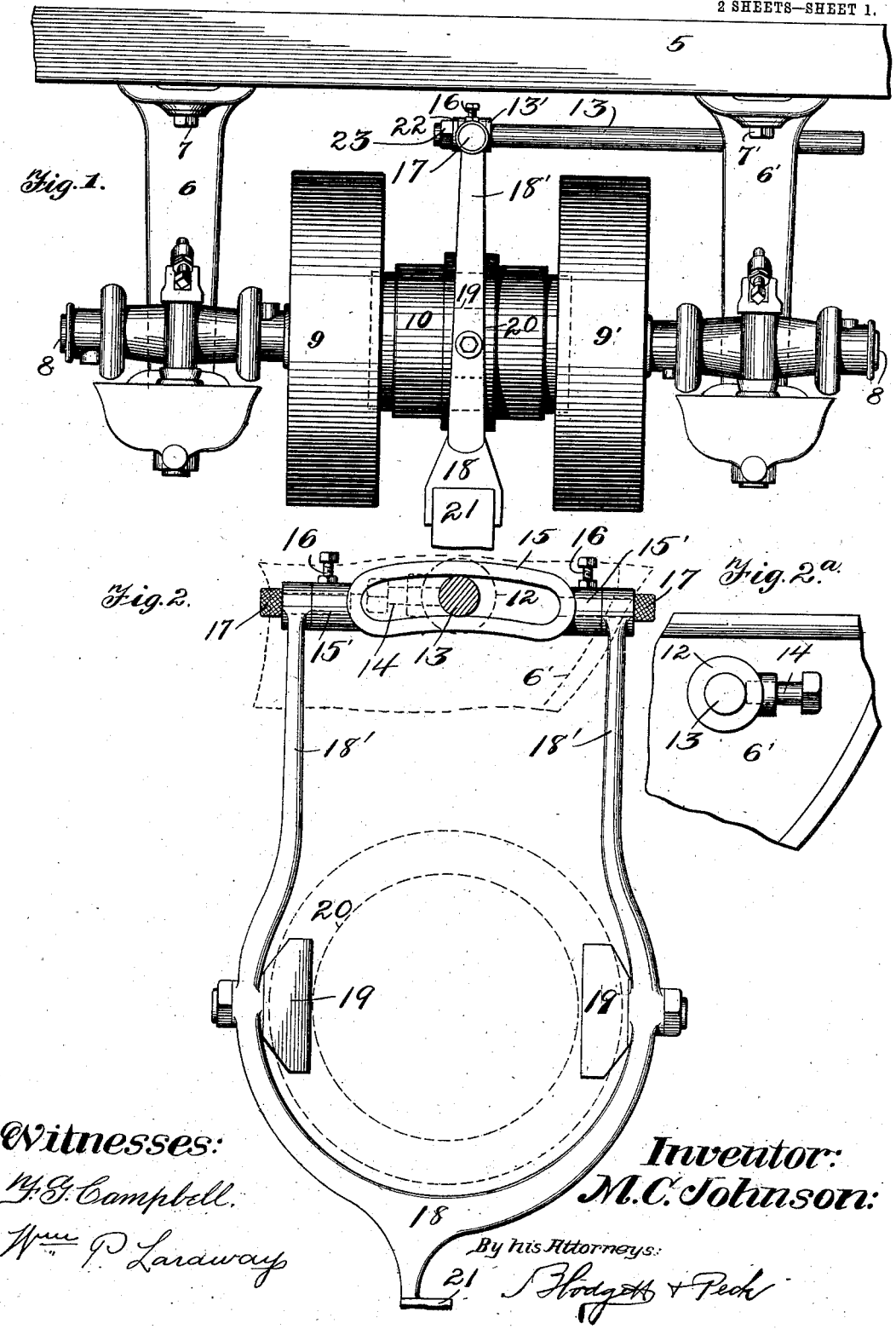

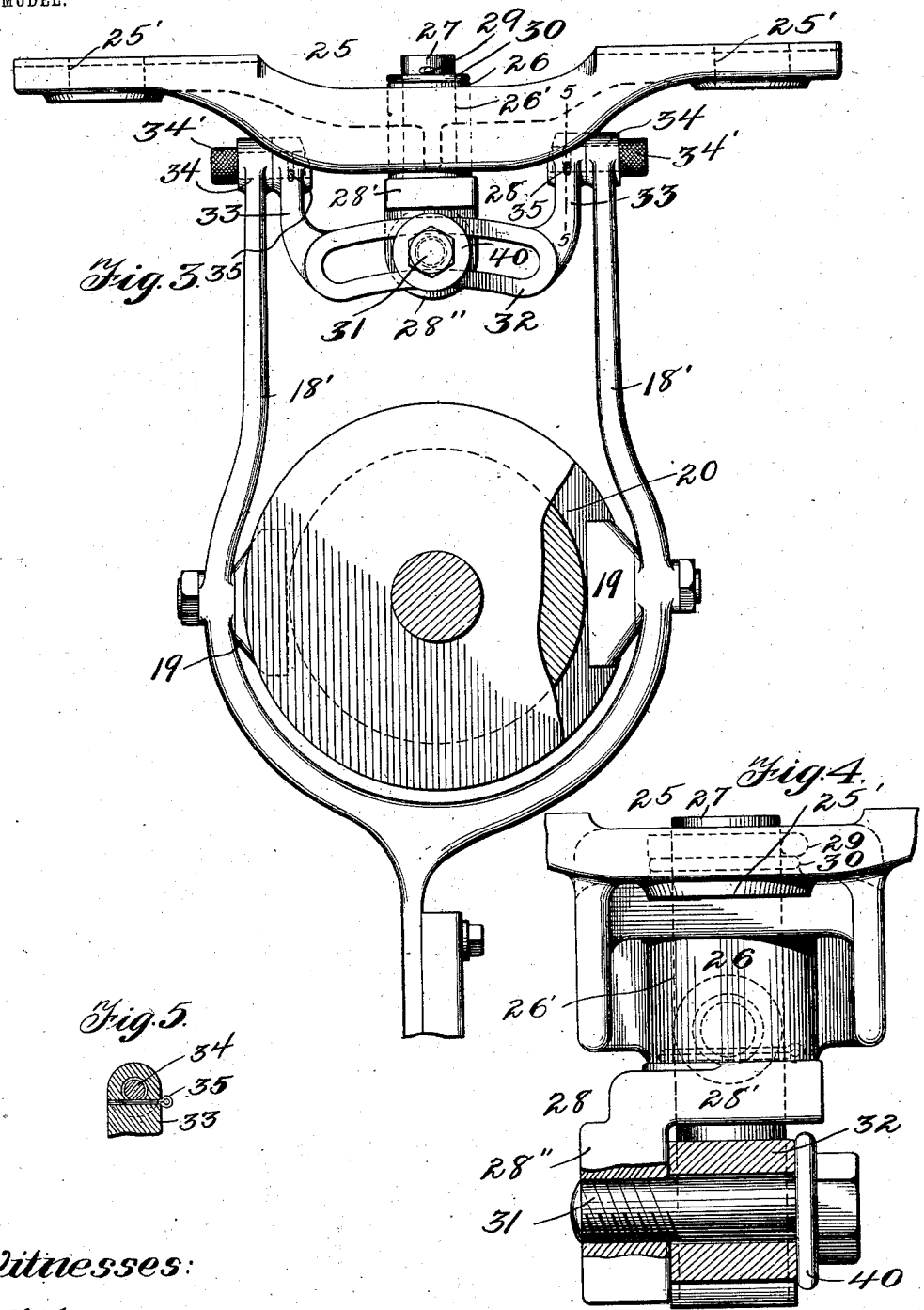

MOSES C. JOHNSON, OF HARTFORD, CONNECTICUT, ASSIGNOR TO THE HELIX GEAR COMPANY, OF HARTFORD, CONNECTICUT, A CORPORATION OF CONNECTICUT.

SHIFTING-LEVER.

SPECIFICATION forming part of Letters Patent No. 717,861, dated January 6, 1903.

Application filed April 29, 1902. Serial No. 105,142. (No model.)

*To all whom it may concern:*

Be it known that I, MOSES C. JOHNSON, a citizen of the United States, residing at Hartford, in the county of Hartford and State of Connecticut, have invented certain new and useful Improvements in Shifting-Levers, of which the following is a specification.

My invention relates to shifting-levers for clutches or other power-transmitting devices, and has for its object the provision of improved means for guiding and supporting said shifting-levers.

A further object of the invention is the provision of means for guiding and supporting a shifting-lever which will permit said lever to be set at any desired angle to the shaft on which the clutch or other element with which the lever is in engagement is located.

A further object of the invention is the provision of means for supporting a shifting-lever in such a way that the position of the device with which the lever engages may be changed, as desired, without affecting the utility of the lever for accomplishing its accepted result.

In the accompanying drawings, Figure 1 is a view in elevation of a shaft having a power-transmitting element with which my improved shifting-lever is in engagement, the handle of said lever being broken away. Fig. 2 is a side elevation of the improved shifting-lever, the hanger in which the support of said lever is mounted being indicated in dotted lines. Fig. 2ª is a partial side view of a hanger, showing the bearing for the rod upon which the shifting-lever is supported. Fig. 3 is a side view of a modified form of the shifting-lever and its guiding and supporting device. Fig. 4 is an end elevation, partially in section and upon an enlarged scale, of the device shown in Fig. 3; and Fig. 5 is a transverse section on line 5 5 of Fig. 3 of one of the arms of the yoke part of the shifting-lever.

Like numerals designate similar parts throughout the several views of the drawings.

Referring to Figs. 1 and 2 of the drawings, the numeral 5 designates a support, which may be of any kind, and the numerals 6 6' hangers secured to said support by bolts 7 7', said hangers serving to sustain the journal-boxes of a shaft 8, to which power may be applied through pulleys 9 9', loosely mounted upon said shaft and adapted to be positively secured thereto when desired by a clutch 10 or other power-transmitting device. Mounted for longitudinal movement in a bearing 12 of the hanger 6' is a rod 13, said rod being secured in position after adjustment by a screw 14, as illustrated in Fig. 2ª. This rod is provided with a collar 13' on its inner end, and fitted over the portion of the rod adjacent to said collar is the slotted yoke 15, having bearings 15', in which are secured by screws 16 bolts 17, upon which the arms 18' of a shipper-fork 18 are swiveled. Adjacent to their lower ends said arms 18' are provided with pivoted shoes 19, fitted in a groove 20 of the power-transmitting element employed, and to the lower end of the shipper-fork is secured the usual grasping lever or handle 21, shown broken away in the various figures. At its inner end the rod 13 is threaded, and upon it are placed a washer 22 and a nut 23.

It frequently happens that it is necessary to so adjust the shipper-fork that its actuating-lever may stand either perpendicularly or at any desired angle to the device which it operates, and to accomplish said result in the present case it is merely necessary to loosen the nut 23 upon the end of the rod 13 and to swing the yoke 15 and its attached shipper-fork around (the arc-shaped slot of the yoke traveling over the inner end of the rod) until the operating-handle 21 is brought to the desired place, when the nut is tightened to clamp the yoke in its adjusted position. When this has been accomplished, the clutch or other power-transmitting device 10, splined to the shaft, may be readily shifted in the usual manner by manipulating the lever 21, the end of the arms 18' of the shipper-fork swiveling upon the bolts 17 when the lever is operated, as above stated. So, too, if it is desired to adjust the shipper-fork to any position along the line of the shaft where the clutch or other power-transmitting device is placed the screw 14 may be loosened and the rod 13 longitudinally adjusted in its bearing 12 to accomplish this result.

In the form of my invention illustrated in Figs. 3, 4, and 5 the support for the shipper-fork is shown comprising a hanger 25, which may be adjustably secured to a ceiling or other suitable support by bolts passed through its slotted ends 25', said hanger having a central vertical boss 26, perforated at 26' to receive the stem 27 of a yoke-support 28, and said stem being secured in place, with the capability of turning in its seat, by a cotter-pin 29, bearing against a washer 30, sleeved upon the stem. In virtue of this construction the yoke-support is capable of a swiveling movement to enable the shifting-lever to be adjusted should the hanger 25 or the shaft 8 be out of their proper positions or purposely so located that such an adjustment would be necessary. The yoke-support 28 has a horizontal extension 28', fitting against the bottom of the wall of the perforated boss 26, and a depending arm 28", into which is threaded a bolt 31, carrying a slotted yoke 32, having vertical arms 33, to which are secured the arms 18' of a shipper-fork similar to the one hereinbefore described, said shipper-fork having pivoted shoes 19, fitting in a groove 20 of the clutch or other power-transmitting element, as hereinbefore described. The arms 18' of the shipper-fork are secured to the vertical arms of the yoke by bolts 34, having milled heads 34' to facilitate their removal when it is so desired, said bolts being secured in place by cotter-pins 35, passed through the vertical arms of the yoke and engaging circular grooves in the bolts 34. In this form of my invention when it is desired to adjust the shipper-fork at an angle to the device it is designed to operate the bolt 31 is retracted, and after such adjustment of the yoke over the shank of the bolt as may be necessary said bolt is tightened to clamp the yoke between the depending arm 28" of the yoke-support 28 and a flange 40 beneath the head of the bolt 31, and thereby secure said yoke, and in consequence the shipper-fork, in the position desired.

Many changes may be made in the details of the constructions described without departure from the invention, and the improved means illustrated may be employed to shift power-transmitting devices on the shaft different from the clutch illustrated, and the rod 13 may be mounted in the hanger 6 instead of the hanger 6'.

Having thus described my invention, what I claim is—

1. The combination, with a support, of a device adjustably secured to said support; a shifting-lever mounted for movement upon said device; a shaft; an element loosely mounted on said shaft; and a shiftable element connected to the shaft, and adapted to be actuated by said shifting-lever.

2. The combination, with a support, of a yoke having a slot fitted over said support; means for adjustably securing the yoke to the support; and a shifting-lever pivotally connected to the yoke.

3. The combination, with a support, of a slotted yoke adjustably mounted on said support; a nut threaded upon the support, and adapted to secure the yoke in position after adjustment; a shifting-lever pivoted to the yoke; a shaft; a pair of loosely-mounted elements carried by said shaft; and a shiftable element connected to the shaft between said loosely-mounted elements, and adapted to be actuated by said shifting-lever.

4. The combination, with a support, of a slotted yoke adjustably secured to said support, said yoke having perforated extensions; a shipper-lever having perforated arms; bolts passing through said arms; and means for securing the bolts in the perforated extensions of the yoke.

5. The combination, with a shaft, of shaft-supports; a rod mounted for adjustment on one of said supports; a device adjustably secured to the rod; and a shifting-lever the arms of which are swiveled to said device.

6. The combination, with hangers, of a shaft carried by said hangers; a rod mounted in a bearing of one of the hangers; a device having a slot, said device being adjustable transversely of the rod; means for clamping the device to the rod when adjusted; and a shipper-lever the arms of which are swiveled to said device.

7. The combination, with a hanger, of a rod mounted for longitudinal adjustment in a bearing thereof; a slotted yoke; means for adjustably securing said yoke to the rod; and a shipper-lever having arms swiveled to the yoke.

8. The combination, with a hanger, of a rod adjustably mounted in a bearing of said hanger; means for clamping the rod in position when adjusted; a yoke having an arc-shaped slot, said yoke fitting over the end of the rod and being transversely adjustable thereon; means for securing the yoke in position when adjusted; a shipper-lever, the arms of which are swiveled upon the yoke; and shoes carried by the shipper-lever.

9. The combination, with a hanger, of a rod adjustably secured in a perforation of said hanger, said rod having a shoulder; a yoke having a slot fitted over the end of the rod, said yoke bearing against the shoulder; means for securing the yoke in position; and a shipper-lever mounted for swinging movement upon the yoke.

In testimony whereof I affix my signature in presence of two witnesses.

MOSES C. JOHNSON.

Witnesses:
WM. P. LARAWAY,
FRANK G. CAMPBELL.